United States Patent [19]

Woodruff et al.

[11] 4,004,265
[45] Jan. 18, 1977

[54] SELF-PROPELLED ARRAY SYSTEM

[75] Inventors: Thomas E. Woodruff, Nashua; Samuel S. Ballard; Roger I. Saunders, both of Hollis; Everett W. Farmer, Nashua, all of N.H.

[73] Assignee: Sanders Associates, Inc., South Nashua, N.H.

[22] Filed: Apr. 28, 1976

[21] Appl. No.: 681,086

Related U.S. Application Data

[63] Continuation-in-part of Ser. No. 494,154, Aug. 2, 1974, abandoned.

[52] U.S. Cl. .................... 340/2; 340/6 R; 340/3 T
[51] Int. Cl.² ........................... G01S 3/80
[58] Field of Search ............ 340/2, 3 T, 6 R; 9/8 R

[56] References Cited

UNITED STATES PATENTS

| | | | |
|---|---|---|---|
| 2,422,337 | 6/1947 | Chilowsky | 340/2 |
| 2,941,492 | 6/1960 | Wilcoxon | 340/2 |
| 3,191,202 | 6/1965 | Handler | 9/8 R |
| 3,543,228 | 11/1970 | Farmer et al. | 340/2 |
| 3,800,271 | 3/1974 | Stillman, Jr. | 340/2 |
| 3,944,964 | 3/1976 | Loeser et al. | 340/2 |

*Primary Examiner*—Richard A. Farley
*Attorney, Agent, or Firm*—Louis Etlinger; William L. Hunter

[57] ABSTRACT

A hydrophone array system comprising a plurality of hydrophones fastened to a cable is deployed beneath the sea in a substantially horizontal straight line. A small powered thruster fastened to one end of the cable urges it in a first direction and this urging is resisted by a member, such as a drogue or an anchored subsurface float, fastened to the other end of the cable. Individual signals from each of the hydrophones are conducted to the surface where they are processed and transmitted by a radio link to a nearby aircraft or surface vessel. Beam forming and analysis is performed aboard the aircraft or surface vessel.

28 Claims, 28 Drawing Figures

SELF-PROPELLED ARRAY SYSTEM

CROSS REFERENCE TO RELATED APPLICATION

This application is a continuation in part of our co-pending application Ser. No. 494,154 filed Aug. 2, 1974, now abandoned.

FIELD OF THE INVENTION

This invention relates generally to underwater listening devices and particularly to an array of such devices deployed in a substantially horizontal straight line beneath the surface of the sea.

BACKGROUND OF THE INVENTION

As the art of underwater listening progresses, the equipment is required to detect fainter and fainter sounds at greater and greater distances with more and more directional precision. The art has advanced so that the designer now has available very sensitive hydrophones and sophisticated beam forming techniques. One way to take advantage of these advances is to deploy the hydrophones in a substantially horizontal straight line beneath the surface as far removed as possible from sources of unwanted sounds, or noise.

In the past, an array of hydrophones has been deployed in a straight line beneath the surface by stringing the hydrophones along a cable towed by a surface ship or low flying helicopter with or without an intermediate buoyant "fish" such as a long cylindrical body. Depth has been controlled by adjusting the buoyancy of the array and/or by the use of weights on the cable itself, the whole being supported by surface floats. Such an arrangement, although suitable for many purposes, has the disadvantage of requiring the presence of the ship during operation which is not only expensive and highly visible but which is a source of noise.

It has been proposed to dispense with the ship by suspending one end of the array from a surface float. It has been found, by suitably adjusting the buoyancy of the array and its hydrodynamic characteristics and by terminating the other end of the array with a sea anchor, that such an array can be stretched out into a substantially horizontal straight line provided there is sufficient current at the required depth. However, when the current drops below a critical value, the array will not hold its straightness.

It is a general object of the present invention to provide an improved system for deploying an array of hydrophones.

A more specific object of the invention is to provide an improved system for deploying a series of hydrophones in a quiet environment beneath the surface of the sea in a substantially straight horizontal line.

SUMMARY OF THE INVENTION

Briefly stated, the invention is based in part on the discovery that very little tension is required to maintain a neutrally buoyant line of hydrophones extended in a straight line beneath the surface of the sea. The invention is also based in part on the further discovery that such tension may be obtained by a small powered thruster on one end of the line, for urging the line forward, along with something on the other end of the line for resisting such urging. This provides the tension necessary to achieve array straightness while maintaining a very low velocity of the array through the water to minimize flow induced noise. Vibration isolation, such as resilient motor mounts and a bungee in the line, improves performance.

BRIEF DESCRIPTION OF THE DRAWING

For a clearer understanding of the invention reference may be made to the following detailed description and the accompanying drawing, in which:

FIG. 8b is a cross section view taken on the line 8b—8b of FIG. 8a;

DESCRIPTION OF PREFERRED EMBODIMENT

The array system of the invention may be placed in the sea in various ways, for example, by lowering it over the side of a surface vessel, but it is believed that it will have its widest application when packaged in a sonobuoy casing and deployed by an aircraft. Accordingly, a preferred embodiment will first be described as so packaged and deployed.

Figure 1:
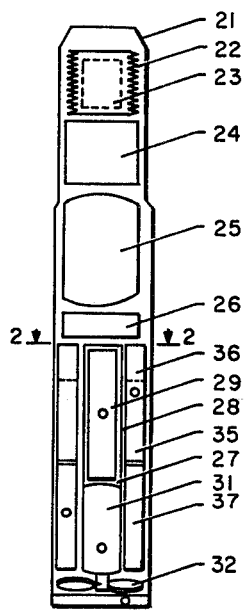
FIG. 1 is a schematic elevation view showing how the components of the apparatus can be arranged within a sonobuoy.

Referring first to FIG. 1 there is shown the casing 21 of a sonobuoy which is assumed to have been cut away so as to show how the various components may be arranged therein prior to deployment. At the top of the casing 21 there is shown a transmitter float 22 in its deflated condition with a transmitter 23 within. Beneath the float 22 is stored the signal and suspension cable 24 and beneath that an electronics package 25 which may contain various electronic components such as a compass, a multiplexer, modulators, amplifiers and the like. A sea anchor, or drogue, 26 is stored just below the electronics package. Below the drogue 26, on the axis of the casing 21, is stored a powered thruster, indicated generally by the reference character 27, and including a housing 28. Any of various kinds of internal or external power sources, such as electricity or compressed gas, may be used with any of various propulsion arrangements, such as gas or water jets. The thruster should, of course, be constructed to generate as little noise as possible. Not only should the internal mechanism operate quietly but the propulsion system should cause as little flow induced noise as possible. It is at present preferred that the thruster 27 include a battery 29 and an electric motor 31 within the housing 28 and a propeller 32 mounted exteriorly at one end of the housing 28 and operatively connected to the motor 31.

Figure 2:
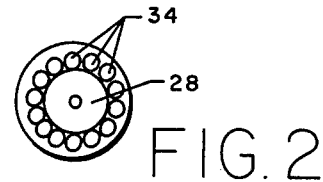
FIG. 2 is a schematic cross section view taken on the line 2—2 of FIG. 1.

As best shown in FIG. 2, a plurality of hydrophone assemblies 34 are positioned beneath the drogue 26 and surrounding the housing 28 of the thruster 27. As indicated schematically in FIG. 1, each of the assemblies 34 comprises a preamplifier 35 connected to and packaged with one electro-acoustic transducer such as a hydrophone 36 to form one hydrophone assembly 34. Immediately beneath the assemblies 34 and also surrounding the thruster 27 is a series of packages containing a cable 37 which, as will be more fully discussed, is connected to each of the hydrophone assemblies 34.

Figure 3:
FIGS. 3, 4, 5, 6 and 7 are schematic views showing successive stages in the deployment of the array system of the invention, with FIG. 7 showing the apparatus fully deployed in operative position.

Referring now to FIG. 3, there is shown a sonobuoy indicated generally by the reference character 41 and including an outer skin 42 and a rotochute 43. The sonobuoy 41, containing the components as explained in connection with FIGS. 1 and 2, is shown after its release by an aircraft as it is about to enter the water 44. The rotochute 43, as is well known, is provided to slow the descent of the buoy so that it does not strike the water too hard.

Figure 4:
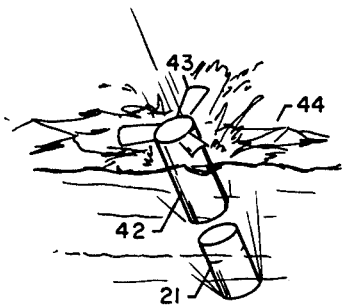
Figure 5:
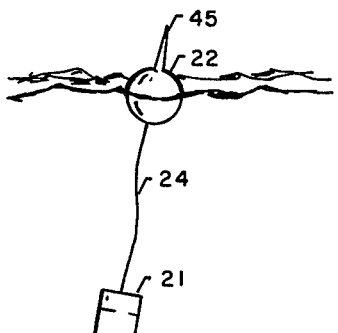

FIG. 4 shows the buoy just after striking the water. The skin 42 and the rotochute 43 are jettisoned and the remainder of the sonobuoy starts its descent. At about the same time the transmitter float 22 is inflated and, as shown in FIG. 5, rises to the surface with the transmitter 23 inside. A previously retracted antenna 45 is extended. The previously mentioned cable 24 includes both load bearing and signal carrying elements. One end of the cable is mechanically connected to the float 22 and is electrically connected to the transmitter 23. As the buoy descends, the cable 24 is payed out until a predetermined depth is reached.

Figure 6:
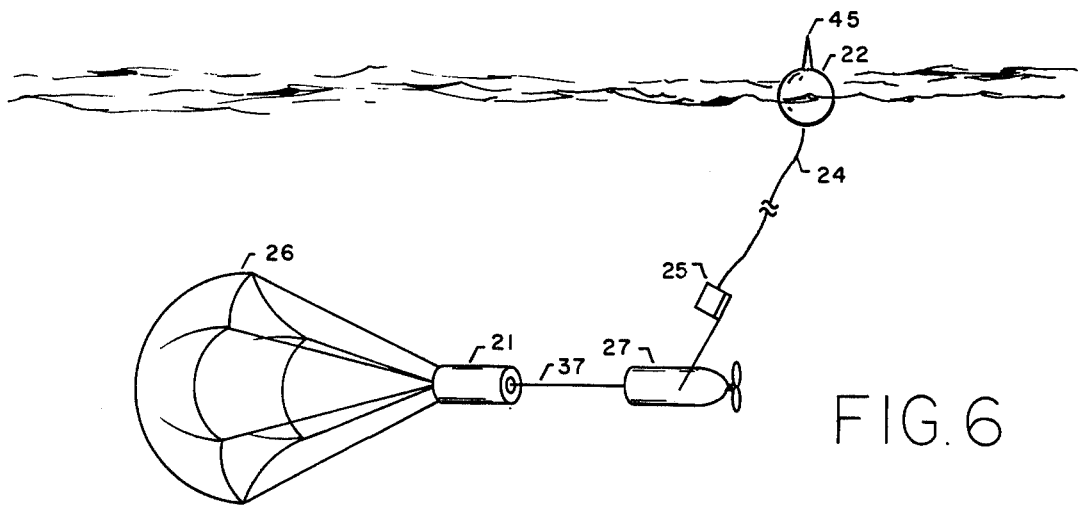

When the predetermined depth is reached, the drogue 26, the electronics package 25 and the thruster 27 are released from the housing 21. As shown in FIG. 6, the surface current drag on the transmitter float 22 acts, through the cable 24 and the electronics package 25, to pull the thruster 27 and the cable 37 away from the housing 21 and drogue 26. This establishes a preferred direction for the subsequent extension of the array, that is, downstream.

Figure 7:
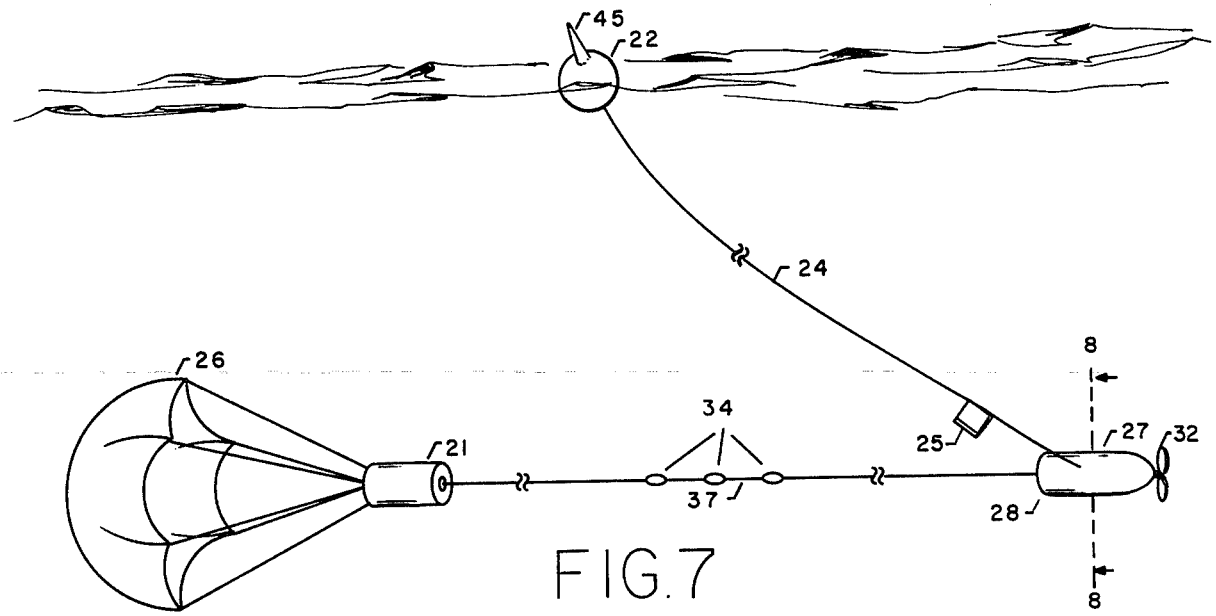

Next, as best shown in FIG. 7, the thruster 27 is activated and further pulls on the cable 37 to which each of the hydrophone assemblies 34 is attached until the array is fully extended and completely out of the housing 21. As shown, the housing 21 and the drogue 26 are fastened to the end of the cable which is remote from the thruster 27 and this at present is the preferred arrangement although it would be possible to have the casing 21 joined to the thruster 27. The cable 37, like the cable 24, includes a plurality of elements some of which are mechanical load bearing elements and others of which are signal conducting elements. The entire array, including the cable 37, the hydrophone assemblies 34, the housing 21 and the drogue 26 are constructed to be of substantially neutral buoyancy. The housing 28 of the thruster 27 is generally right cylindrical in shape and the entire thruster is negatively buoyant, that is, it tends to sink in sea water.

Figure 8:
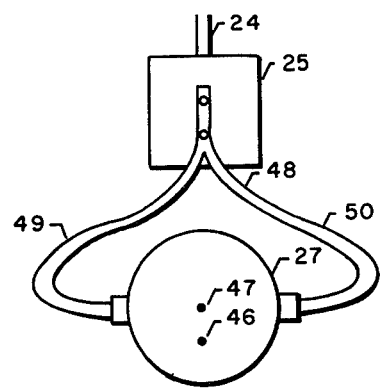
FIG. 8 is a schematic cross section view taken on the line 8—8 of FIG. 7.

As best shown in FIG. 8, the thruster 27 preferably is constructed so that its center of gravity 46 and its center of buoyancy 47 when submerged lie in the same transverse plane but are displaced from each other as shown. With this construction, a force couple is generated, when the thruster 27 is deployed in the water, which urges it to assume a preferred attitude, as shown in the drawing, with its longitudinal axis horizontal and with its center of gravity 46 directly below its center of buoyancy 47. The thruster 27 is supported by the cable 24 preferably by means of a connection including a rigid bracket 48 formed with two arms 49 and 50 which embrace and pivotally engage the housing 28 on opposite sides thereof in the aforesaid transverse plane. The two pivots preferably have a common axis which passes through the center of buoyancy 47. The electronics package 25 is electrically and mechanically connected to the cable 24 and is fastened to the bracket 48 which is preferably hollow so as to accommodate conductors interconnecting the electronics package 25 with the interior of the thruster housing 28. As shown in FIG. 7, the cable 37 is mechanically connected to the end of the thruster 27 remote from the propeller 32 and its conductors pass through the housing 28 to the interior thereof so that suitable electronic connections can be made.

It has been found that with the apparatus deployed as explained above, the thruster 27 may expend very little power yet be capable of exerting enough tension on the cable 37 and the hydrophone assemblies 34, as restrained by the drogue 26, to hold the array stretched out in a substantially horizontal straight line with little or no forward motion. The pivotal connection of the bracket 48 allows the thruster to assume its preferred horizontal attitude, as previously explained. The thruster 27 cannot rise, even if momentarily displaced from its preferred attitude, because it has insufficient thrust to overcome its negative buoyancy and that of cable 24. It cannot sink because it is supported by the cable 24. The rigid arm 48 and the positively buoyant electronics package 25 serve as a stabilizing fin and prevent the thruster 27 from rotating about its axis and winding up the cables.

By way of example, the array may comprise thirteen hydrophone assemblies 34 logarithmically spaced about its center and covering a distance of approximately 300 feet. The signal from each hydrophone, as amplified by its preamplifier, is passed to the electronics package 25 where the signals are processed further and conducted up the cable 24 to the transmitter 23 in the float 22. In most cases it is preferred that the signals be transmitted to a nearby aircraft or surface vessel where all beam forming and analysis takes place although in some instances it may be desirable to include beam forming equipment in the electronics package 25 and/or the float 22. Analysis and beam forming in the air or surface craft is usually preferred because by this arrangement, the complexity of the equipment in the sonobuoy is greatly reduced and at the same time full advantage can be taken of modern beam forming techniques.

It is to be noted that the various means and methods for deploying the apparatus such as the ejection of the skin 42 and rotochute 43, the paying out of the cable 24, the sensing of the proper depth, and the techniques for separating the various portions and for activating the thruster 27 all comprise techniques well known in the sonobuoy art. Such techniques, in and of themselves, do not form a part of the present invention and accordingly have not been described in detail.

A hydrophone array system as so far described operates satisfactorily but is subject to certain limitations caused by noise generated by the thruster. It has been found that such noise is transmitted both directly through the water and over the cable 37. If most of the noise is at frequencies outside the frequency band of interest, the noise may be unobjectionable. In any case, by making the cable 37 between the thruster and the first hydrophone very long, the noise reaching the hydrophones can be reduced substantially. However, it is preferred at present to provide for isolation of the source of the noise within the thruster and to minimize its transmission through the cable 37.

Figure 8A:
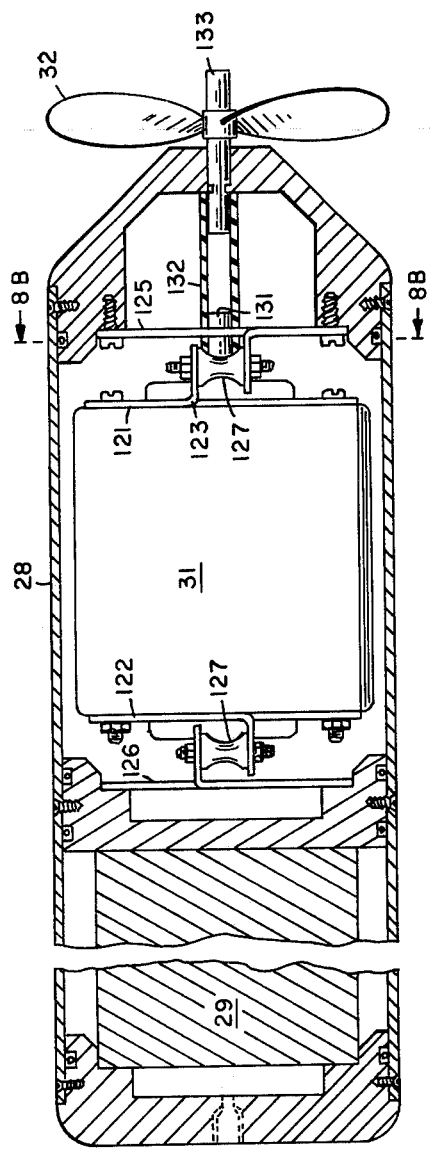
FIG. 8a is a schematic cross section view, with parts in elevation, of the thruster.
Figure 8B:
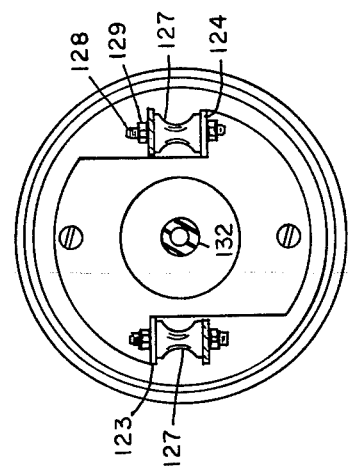

Referring now to FIGS. 8a and 8b, a pair of brackets 121 and 122 are mounted on opposite ends of the motor 31. Each bracket is formed with two tabs such as the tabs 123 and 124 extending parallel to the motor axis on opposite sides thereof and with one above and the other below the axis as viewed in FIGS. 8a and 8b. A pair of similar but complementary brackets 125 and 126 are fastened to the housing 28 as shown. The motor 31 is mounted by means of four vibration isolators 127, two of which interconnect the brackets 121 and 125 while the other two interconnect the brackets 122 and 126. Each isolator 127 is preferably a commercially available unit comprising a resilient material such as rubber into each end of which a stud 128 is molded. The studs extend through holes in the tabs and are fastened with nuts 129. The isolators 127 operate in the usual way to reduce the transmission of vibration from the motor 31 to the housing 28.

Power from the motor 31 is transmitted to its output shaft 131 and then through a flexible coupling 132 in the form of a sleeve of resilient material such as rubber to a shaft 133 to which the propeller 32 is fastened. The coupling 132 serves to prevent the transmission of unwanted vibrations from the motor 31 to the propeller 32.

Figure 8C:
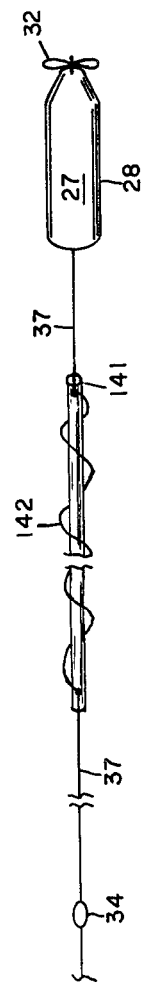
FIG. 8c is a schematic diagram of a portion of the system.

Referring now to FIG. 8c, there is shown an arrangement for minimizing the transmission of noise through the cable 37. Adjacent to the thruster 27, a section of the cable 37 is, in effect, composed of two portions. The first portion is a resilient portion or bungee 141 while the second portion is the signal carrying portion 142. The resilient portion 141 may comprise a length of resilient material such as a latex rubber cord capable of being stretched to three or more times its unstretched length without breaking. The portion 142 is wrapped loosely around the portion 141 and is fastened thereto at both its forward and aft ends. The portion 142 is sufficiently long between its points of attachment to the bungee 141 so that it remains slack at all times. From the aft point of attachment, the cable 37 extends on to the array of hydrophone assemblies 34.

The bungee 141 carries the complete mechanical load between the two points at which the portion 142 is fastened to it. One satisfactory example is a bungee made of ¼ inch diameter latex rubber cord, 12 feet long in its unstretched condition and capable of extending to 40 feet or so. The portion 142 is preferably about sixty feet long between its points of attachment to the bungee. Preferably there is about one hundred feet of the cable 37 between the bungee 141 and the first hydrophone assembly 34 of the array.

It has been found that the use of the vibration isolators 127, the flexible coupling 132 and the bungee 141 as above described, substantially eliminates the problem of noise transmission to the hydrophones.

Figure 9:
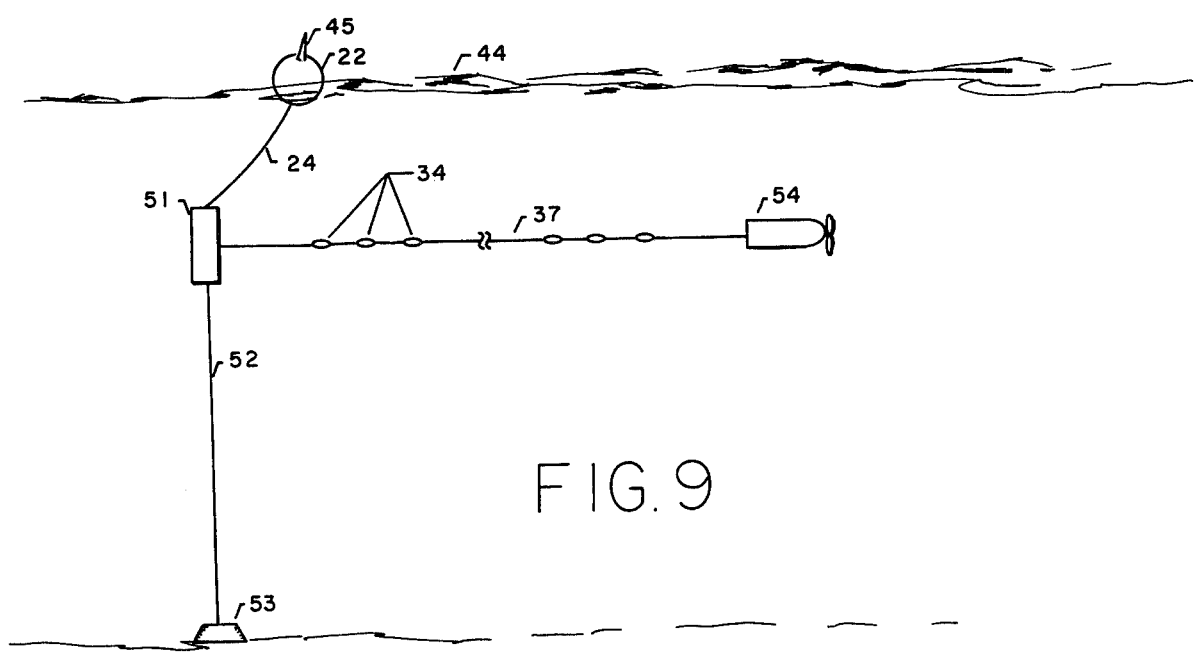
FIGS. 9, 10, 11 and 12 are schematic views of modified forms of the invention.

Referring now to FIG. 9, there is shown a modified form of the invention. This form includes a subsurface, buoyant body 51 which is held at a predetermined selected depth beneath the surface of a cable 52 which extends downward to an anchor 53 at the bottom of the sea. The body 51 contains an electronics package having components like those in the package 25. A thruster 54, which is made to be of substantially neutral buoyancy, is, as before, connected to one end of the cable 37. However, the other end of the cable 37 is connected to the body 51 which, aided by the anchor 53, serves as the member which resists the urging of the thruster 54 in much the same way as the drogue 26 of the previous figures resists the urging of the thruster 27. In either case, the result is that the array of hydrophone assemblies 34 on the cable 37 is held in a substantially horizontal straight line. In the embodiment of FIG. 9, the signals from the hydrophone assemblies 34 are conducted in a direction away from the thruster 54 and into the electronics package contained within the body 51 where they are processed further and then conducted up the cable 24, the lower end of which is attached to the body 51, up to the transmitter 23 within the float 22. The beam forming and analysis is performed in the aircraft or surface vessel to which the signals are transmitted, just as it was in the case of the previously described embodiment.

Figure 10:
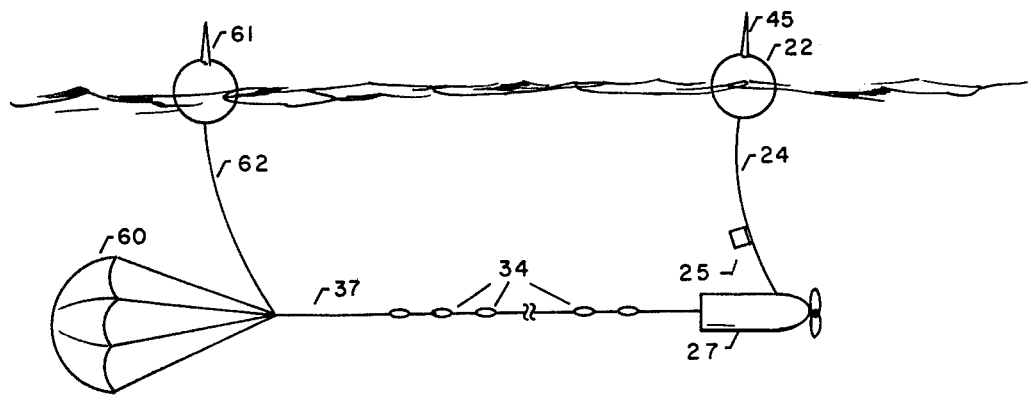

FIG. 10 illustrates an embodiment of the invention similar to that of FIG. 7 but in which a negatively buoyant drogue 60 replaces the drogue 26 and in which there has been added an auxiliary buoyant body or surface float 61 and a cable 62 of substantially the same length as the cable 24 extending from the float to the drogue to insure that the latter stays at the proper depth.

Figure 11:
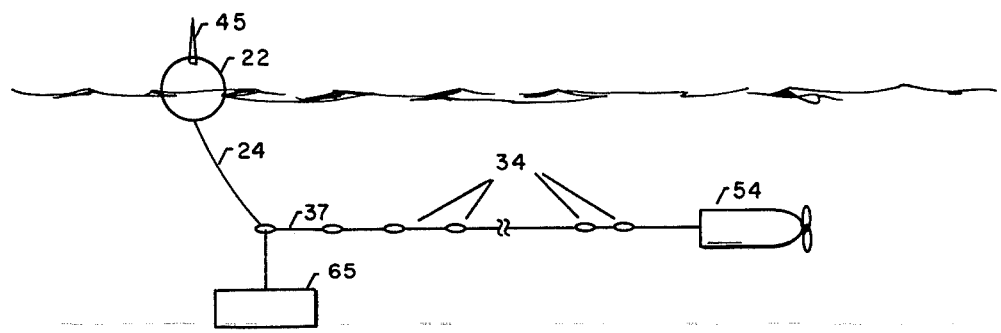

FIG. 11 illustrates an embodiment similar to that of FIG. 9 except that the subsurface body 51, cable 52 and anchor 53 have been replaced by a weight 65 which also contains an electronics package similar to the package 25.

Figure 12:
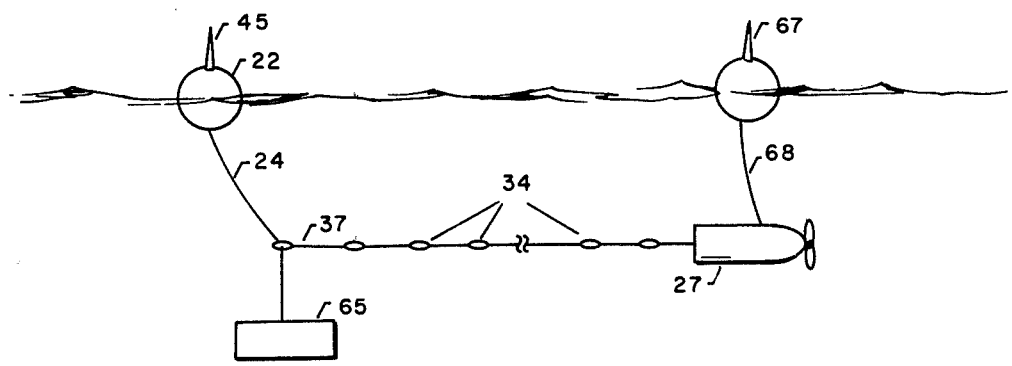

FIG. 12 illustrates an embodiment similar to that of FIG. 11 except that it employs the negatively buoyant thruster 27 an an auxiliary float 67 and cable 68 to hold the thruster 27 at the proper depth.

The embodiments of the invention so far described are systems in which the array is aligned in a single direction, namely, the direction of the current and in which a very low power thruster is used which exerts only enough tension on the cable to hold the array stretched out, with little or no motion relative to the water mass. Such systems are very valuable for many purposes and, because of the low flow noise, permit the use of extremely sensitive directional hydrophones. However, the principles of the invention are also applicable to controlled systems which are capable of aligning the array in a particular direction relative to geographic coordinates and/or changing the alignment from time to time or continuously in response to a predetermined program or in response to commands. Such systems need not be deployed by a sonobuoy dropped from an aircraft but may be simply put over the side of a ship or set in the water from a helicopter. A preferred embodiment of a controlled system will now be described.

Figure 13:
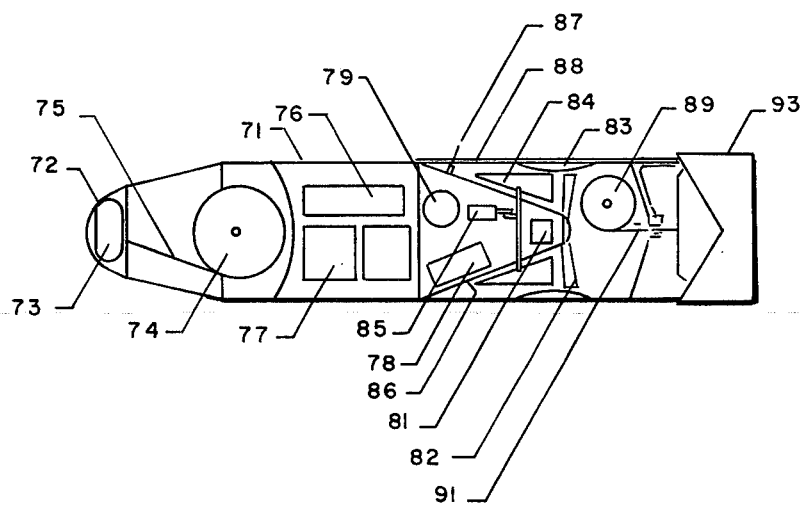
FIG. 13 is a schematic cross section view of another embodiment of the invention before deployment.

Referring now to FIG. 13 there is shown schematically a controlled array system as it may be packaged before deployment. The system includes a generally cylindrical housing 71 the front portion of which includes a removable drogue cover 72. Within the housing, immediately behind the cover 72, is the drogue shute 73. An array winch 74 has wound around it the entire array including the sensitive elements and is connected by means of the array cable 75 to the drogue shute 73. Adjacent to the winch 74 is a guidance and control package 76 which includes the necessary control equipment such as relays, valves, solenoids, servo amplifiers, comparator circuits etc. necessary to control the operation of the system. Adjacent to the control package 76 are storage batteries 77 which supply the energy for operation of the system. To the right of the batteries, as shown in FIG. 13, is a motor and pump assembly 78 which maintains fluid under pressure in a tank 79 which serves as an accumulator and reservoir. To the right of the assembly 78 is a propulsion motor 81 which is operatively connected to a propeller 82. The housing 71 is formed with openings 83 which allow water to be expelled from the rear of the propeller 82. A rudder is positioned adjacent to the propeller 82 and is controlled by an actuator 85. An auxiliary housing 86 separates the propeller 82 and the rudder 84 from the remainder of the apparatus, allowing the propeller and rudder to engage the water while keeping the other components dry. The housing 86 carries an electrical test plug 87 which facilitates electrical connections between the various components and external test apparatus. An elastic suspension link 88 is fastened to the housing 71 at the longitudinal center of gravity of the entire system and normally is positioned flush against the exterior surface. The purpose of this link will be described subsequently. Immediately behind the propeller 82 is a suspension winch 89 around which is wound the suspension cable 91 and a signal cable 92 (not shown separately in FIG. 13) both of which are connected to a separable float package 93. The package 93 is buoyant and includes a radio transmitter, a receiver, and an antenna and a recovery mast.

Figures 14, 15, 16, 17, 18:
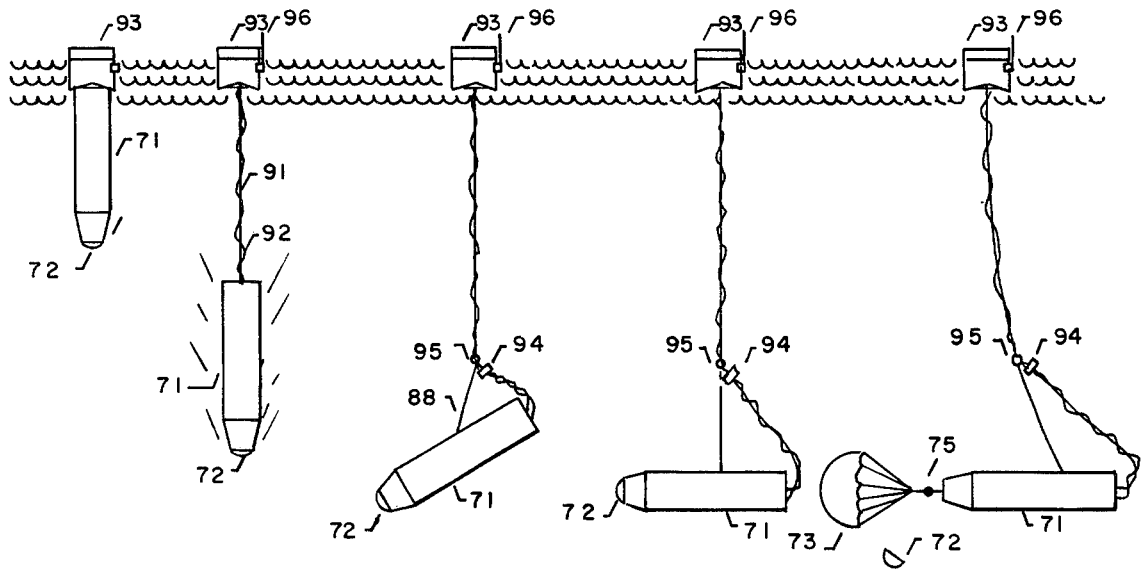
FIGS. 14, 15, 16, 17, 18 and 19 are schematic elevation views showing successive stages in the deployment of the embodiment of FIG. 13.

FIGS. 14-18 illustrate the deployment of the system. It may be dropped from a high flying aircraft in which case its descent should be slowed by means of a rotochute such as illustrated in FIGS. 3 and 4 or it may be simply deposited in the water by a surface ship or a low flying helicopter. In any event, shortly after reaching the water, it will return to the surface, as illustrated in FIG. 14, by virtue of the buoyancy of the package 93. Then, by mechanisms well known in the sonobuoy art, the deployment sequence is initiated. More particularly, the package 93 is separated from the housing 71 allowing the latter to sink with or without the aid of the propulsion motor 81 and propeller 82. The suspension winch 89 is released allowing the suspension cable 91, with the signal cable 92 coiled in a series of concentric loops around it, to be unreeled. As the suspension cable 91 pays out, the concentric coils of the signal cable 92 are extended to form a long loose helix along the length of the suspension cable 91 as shown for example in FIG. 15.

As the suspension cable 91 nears the end of its pay out, a small stop 94 fastened to the cable 91 engages a ball 95 that up to this time had been resting on the mouth of the cable guide. The ball 95 is attached to the previously mentioned elastic suspension link 88, the other end of which, as previously mentioned, is fastened to the housing at its longitudinal center of gravity in the water. Thus as the last of the suspension cable is payed out, the weight of the system is gradually transferred to this compliant link 88, resulting in the gradual deceleration of the housing and causing it to swing 90° to a horizontal attitude, as shown in FIGS. 16 and 17. The compliance of the link 88 subsequently serves to help isolate the housing 77 from wave induced motion of the surface float 93. Concurrently with the descent of the system, the antenna 96 is raised up above the float 93.

Figure 19:
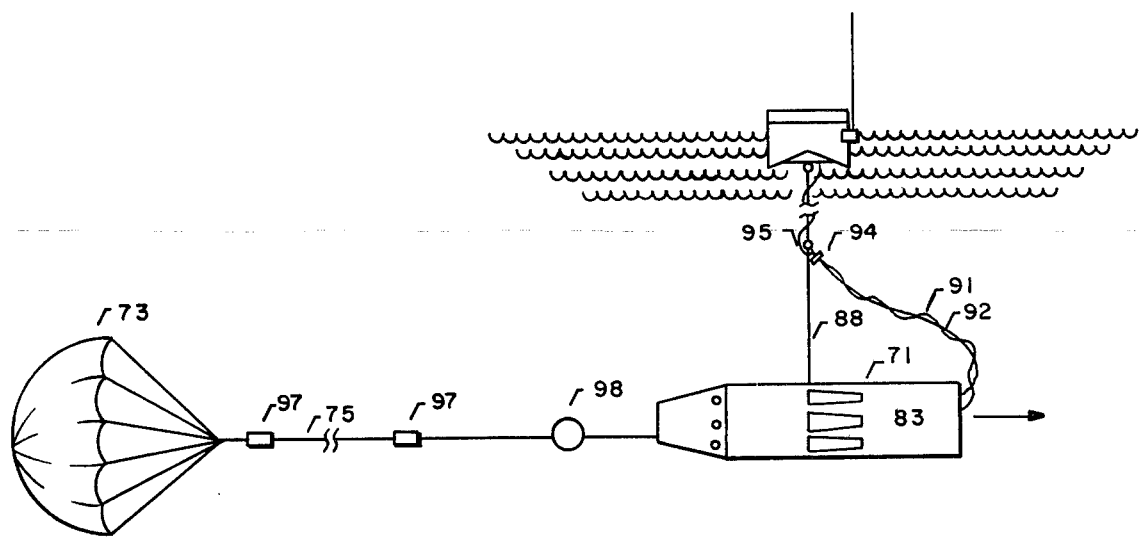

When the housing 71 has reached its predetermined depth, the drogue cover 72 and the drogue 73 are released and the array winch 74 is unlocked permitting the array to pay out from the tug as shown in FIG. 18. If the propulsion motor 81 has not already been energized, it may be energized now so as to hasten the extension of the array to a substantially straight horizontal position as shown in FIG. 19.

The cable 75 includes a plurality of elements some of which are mechanical load bearing elements and others of which are signal conducting elements. Like the cable 37, the cable 75 carries a plurality of hydrophone assemblies 97 spaced along its length appropriately to form an array and preferably includes a bungee as illustrated in FIG. 8c. The cable 75 also carries a small compass 98, electrically connected to the guidance control package 76 within the casing 71.

Figure 20:
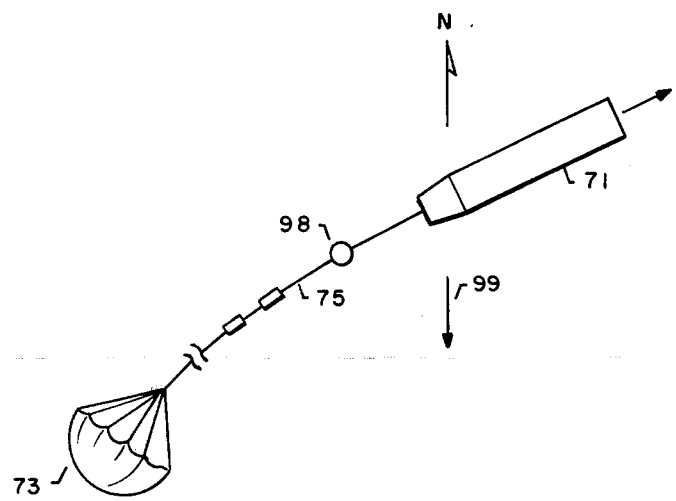
FIG. 20 is a schematic plan view of the embodiment of FIG. 13 after deployment.

If the array is to be oriented in other than a downstream direction, the thruster must develop a force transverse to the array axis to counteract the force produced by the wind and current drag on the surface float, the suspension cable, and the array itself. For example, if, as shown in the plan view of FIG. 20, the current and wind were running north to south as shown by the arrow 99 and it were desired to orient the array west to east, then the thruster must produce a north directed force to balance the south directed drag force generated by the surface float and suspension cable and, in addition, of course, must provide an east oriented thrust to tension the array. FIG. 20 shows the array in the process of being swung around from a north south direction to an east west direction.

Figure 21:
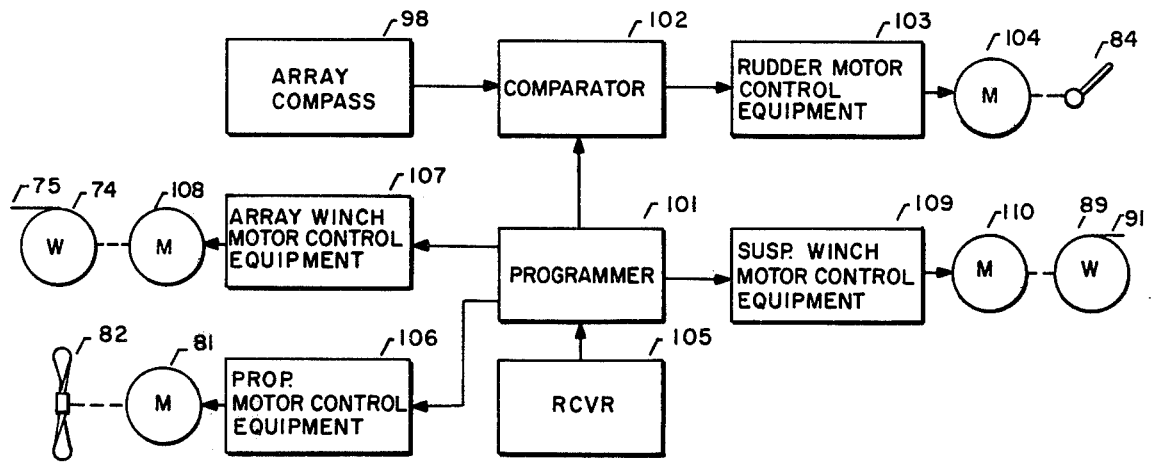
FIG. 21 is a schematic diagram of the control equipment of the embodiment of FIG. 13.

The circuits by which the various control operations are carried out are shown in block schematic form in FIG. 21. In the simplest case, the compass 98 may be one which generates a voltage indicative of actual heading of the array and the programmer 101, which may be contained within the guidance and control package 76, could, in the simplest case, simply be an adjustable voltage which is preset to the desired heading. In that case, the signal indicative of desired heading is compared, in the comparator 102, with the actual heading so as to develop an error signal which in turn, through the rudder motor control equipment 103, controls the motor 104 which actuates the rudder 84 until the error signal vanishes. However, the invention contemplates a more flexible arrangement in which the programmer 101 is capable of changing the signal from time to time or continuously and also in which an external command may be received via the radio receiver 105 so as to override the previously established program and select any desired heading.

Figures 22, 23, 24, 25:
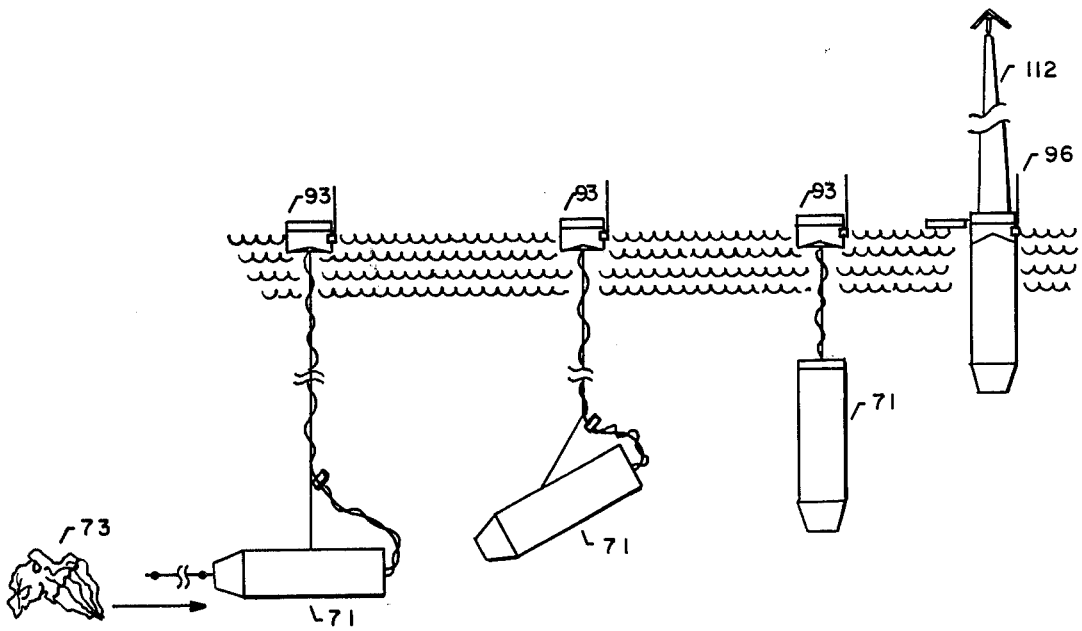
FIGS. 22, 23, 24 and 25 are schematic elevation views showing various stages during the recovery of the embodiment of FIG. 13.

As previously mentioned, the present embodiment contemplates recovery, refurbishment, and redeployment of the system. Recovery of the system is essentially the reverse of deployment. Upon command received via the receiver 105, or alternatively at the end of a preset period of time as determined by the programmer 101, a signal is transmitted to the propulsion motor control equipment 106 which in turn de-energizes the propulsion motor 81. At the same time, another signal is sent to the array winch motor control equipment 107 which energizes the motor 108 so as to actuate the winch 74 and start reeling in the array. At the same time the drogue is released by actuating a mechanism such as a cable cutter adjacent to the point at which the drogue is fastened to the cable 75. The drogue 73 is jettisoned and the array is reeled in as shown in FIG. 22.

When the array is fully retrieved, a signal is sent to the suspension winch motor control equipment 109 which in turn energizes the motor 110 so as to activate the suspension winch 89 which begins to reel in the suspension cable 91. This causes the compliant link 88 to relax and return to its storage position as the housing 71 rotates into a vertical attitude and proceeds to winch its way up to the surface as shown in FIGS. 23 and 24.

When the housing 71 reaches the surface float 93, the two parts fit back together again and a recovery mast 112 is extended upward into a position where it can be engaged by a suitable hook depending from a surface ship or a helicopter.

Refurbishment of the buoy normally involves simply replacing the drogue and drogue cover, recharging the battery, and checking the components with the aid of the test plug 87. The buoy is then ready for redeployment.

It is to be noted that each embodiment includes a cable supporting the array of hydrophones and having a thruster at one end of the cable urging the cable in one direction and something at the other end of the cable to resist the urging, thereby creating tension in the cable and causing it to extend in a substantially straight line.

Although several specific embodiments of the invention have been described in considerable detail for illustrative purposes, many modifications will occur to those skilled in the art. It is therefore desired that the protection afforded by Letters Patent be limited only by the true scope of the appended claims.

What is claimed is:

1. A hydrophone array system comprising a first cable, a plurality of hydrophones connected to said first cable and spaced apart by predetermined distances thereby forming an array, a buoyant body, a transmitter within said body, a second cable extending from said body, and means including said cables for conducting signals from said hydrophones to said transmitter characterized in that said system includes a thruster connected to one end of said first cable for urging it in a preferred direction and a member connected to the other end of said first cable for resisting the urging of said thruster and in that said first cable includes a section adjacent to said thruster which section comprises a first resilient portion and a second, signal carrying portion, said second portion being longer than said first portion, said portions being fastened to each other at each of their ends so that said second portion remains in a slack condition.

2. A hydrophone array system in accordance with claim 1 in which said array is constructed to be substantially neutrally buoyant and in which said thruster includes a housing of generally cylindrical shape and is constructed with a weight distribution such that when submerged said thruster is urged to a predetermined preferred attitude with its longitudinal axis horizontal so as to stretch out said array in a substantially horizontal straight line.

3. A hydrophone array system in accordance with claim 2 in which said thruster is constructed to make its center of gravity and its center of buoyancy lie in the same transverse plane but displaced from each other so that a force couple is generated which urges said thruster toward an attitude with its center of gravity below its center of buoyancy.

4. A hydrophone array system in accordance with claim 1 which includes a plurality of preamplifiers each connected to and packaged with one of said hydrophones thereby constituting a hydrophone assembly.

5. A hydrophone array system in accordance with claim 4 in which said first cable and said hydrophone assemblies are constructed so as to form an array having substantially neutral buoyancy.

6. A hydrophone array system in accordance with claim 1 in which said thruster is constructed to have negative buoyancy.

7. A hydrophone array system in accordance with claim 1 which includes an electronics package connected to said second cable adjacent to that end which is remote from said buoyant body.

8. A hydrophone array system in accordance with claim 1 in which each of said first and second cables includes both load bearing and signal carrying elements.

9. A hydrophone array system in accordance with claim 6 in which said thruster includes a housing of generally cylindrical form.

10. A hydrophone array system in accordance with claim 9 in which said thruster includes a motor within said housing and a propeller mounted exteriorly at one end thereof and operatively connected to said motor and in which said one end of said first cable is connected to the other end of said housing.

11. A hydrophone array system in accordance with claim 10 including a connection between said thruster and that end of said second cable which is remote from said buoyant body.

12. A hydrophone array system in accordance with claim 11 in which said connection includes a rigid bracket having two arms which embrace said housing and are pivotally connected thereto.

13. A hydrophone array system in accordance with claim 12 including an electronics package connected to said bracket and to said second cable.

14. A hydrophone array system in accordance with claim 13 in which said thruster is constructed to make its center of gravity and its center of buoyancy when submerged lie in the same transverse plane but displaced from each other.

15. A hydrophone array system in accordance with claim 1 in which said member is a drogue.

16. A hydrophone array system in accordance with claim 15 in which the end of said second cable remote from said buoyant body is connected to said thruster.

17. A hydrophone array system in accordance with claim 16 in which said drogue is constructed to be negatively buoyant and which includes a surface float and a third cable of the same length as said second cable extending from said float to said drogue to support said drogue.

18. A hydrophone array system in accordance with claim 1 in which said member is an auxiliary buoyant body and which includes an anchor, a third cable interconnecting said member and said anchor, and in which said first and second cables are also connected to said member.

19. A hydrophone array system in accordance with claim 1 which includes a weight and in which the end of said second cable remote from said buoyant body is connected to said other end of said first cable and to said weight.

20. A hydrophone array system in accordance with claim 19 including a second buoyant body and a third cable extending from said second buoyant body to said thruster.

21. A hydrophone array system in accordance with claim 1 which includes means for controlling the direction in which said thruster exerts said urging.

22. A hydrophone array system in accordance with claim 1 including means on said first cable for generating a first signal indicative of the orientation of said array with respect to geographic coordinates.

23. A hydrophone array system in accordance with claim 22 which includes means including a programmer for generating a second signal indicative of the desired orientation of said array and means jointly responsive to said first and second signals for controlling the direction in which said thruster exerts said urging.

24. A hydrophone array system in accordance with claim 1 including a receiver within said buoyant body for receiving command signals and means responsive to said command signals for controlling the direction in which said thruster exerts said urging.

25. A hydrophone array system in accordance with claim 1 including a housing containing said thruster and means within said housing for selectively either paying out said first cable and said array so as to extend exteriorly of said housing or retrieving said array to lie within said housing.

26. A hydrophone array assembly in accordance with claim 1 including a housing containing said thruster and in which said second cable includes a first end fastened to said buoyant body and a second end fastened to said housing and which includes means within said housing for selectively either paying out said second cable so as to extend between said buoyant body and said housing or reeling in said second cable so as to lie substantially entirely within said housing with said housing in engagement with said buoyant body.

27. A hydrophone array system in accordance with claim 1 which includes an extensible mast mounted on said buoyant body to facilitate recovery of said system.

28. A hydrophone array system in accordance with claim 1 in which said thruster includes a motor, a housing, a plurality of vibration isolators mounting said motor to said housing, a propeller mounted for rotation exteriorly of said housing, and a flexible coupling operatively connecting said motor to said housing.

* * * * *